United States Patent
Wittmaak, Jr. et al.

(10) Patent No.: US 12,291,917 B2
(45) Date of Patent: May 6, 2025

(54) DOOR MANAGEMENT

(71) Applicant: Textron Innovations Inc., Providence, RI (US)

(72) Inventors: John Robert Wittmaak, Jr., Newark, TX (US); Michael Rinehart, Euless, TX (US)

(73) Assignee: Textron Innovations Inc., Providence, RI (US)

(*) Notice: Subject to any disclaimer, the term of this patent is extended or adjusted under 35 U.S.C. 154(b) by 5 days.

(21) Appl. No.: 18/226,431

(22) Filed: Jul. 26, 2023

(65) Prior Publication Data

US 2025/0034930 A1    Jan. 30, 2025

(51) Int. Cl.
| | |
|---|---|
| *E05F 15/643* | (2015.01) |
| *B64C 1/14* | (2006.01) |
| *B64C 29/00* | (2006.01) |
| *E05F 11/04* | (2006.01) |

(52) U.S. Cl.
CPC .......... *E05F 15/643* (2015.01); *B64C 1/1438* (2013.01); *B64C 29/0033* (2013.01); *E05F 11/04* (2013.01); *E05Y 2201/21* (2013.01); *E05Y 2201/254* (2013.01); *E05Y 2201/26* (2013.01); *E05Y 2201/408* (2013.01); *E05Y 2900/502* (2013.01); *E05Y 2900/531* (2013.01)

(58) Field of Classification Search
CPC .......... B60J 5/06; B60J 5/062; B64C 1/1407; B64C 1/1423; B64C 1/1438; B64C 1/1461; B64C 29/0033; E05F 11/04; E05F 15/635; E05F 15/643; E05Y 2201/21; E05Y 2201/254; E05Y 2201/26; E05Y 2201/408; E05Y 2900/502; E05Y 2900/531

USPC .............................................. 244/7 A; 49/360
See application file for complete search history.

(56) References Cited

U.S. PATENT DOCUMENTS

| | | | | |
|---|---|---|---|---|
| 2,445,131 | A * | 7/1948 | Wartian ................ | B64C 1/1438 244/129.5 |
| 3,131,892 | A * | 5/1964 | Salmun .................. | B64C 27/04 49/40 |
| 5,069,000 | A * | 12/1991 | Zuckerman .......... | H02H 7/0851 49/214 |
| 5,982,126 | A * | 11/1999 | Hellinga ............... | H02H 7/0851 318/434 |

(Continued)

FOREIGN PATENT DOCUMENTS

EP        3747760 A1 * 12/2020  ........... B64C 1/1438

OTHER PUBLICATIONS

Gebuwin B.V., "TK1000-1500-1001-1501 Spur Gear Box," Winterswijk, The Netherlands, 2 pages.

(Continued)

*Primary Examiner* — Joshua E Rodden
(74) *Attorney, Agent, or Firm* — Bradley Arant Boult Cummings LLP

(57) ABSTRACT

A door management system on an aircraft includes a fuselage extending along a longitudinal axis in a fore-aft direction parallel to forward flight, an opening in a sidewall of the fuselage, a door mounted on the sidewall to slide in the fore-aft direction between a closed position covering the opening and an open position revealing the opening, a cable attached to the fuselage and the door and a speed governor operatively coupled to the cable to limit a velocity of the door as it moves between the open position and the closed position.

20 Claims, 5 Drawing Sheets

(56) References Cited

U.S. PATENT DOCUMENTS

| | | | | |
|---|---|---|---|---|
| 6,038,818 | A * | 3/2000 | Haag | E05F 15/646 |
| | | | | 49/360 |
| 6,076,883 | A * | 6/2000 | Labonde | B60J 5/12 |
| | | | | 49/358 |
| 6,123,134 | A | 9/2000 | Thomas et al. | |
| 6,189,833 | B1 * | 2/2001 | Ambrose | B64C 1/1438 |
| | | | | 244/129.5 |
| 6,208,102 | B1 * | 3/2001 | Kikuchi | G05B 19/416 |
| | | | | 49/138 |
| 6,234,417 | B1 | 5/2001 | Sauder et al. | |
| 7,086,441 | B2 | 8/2006 | Barriault et al. | |
| 7,360,736 | B2 | 4/2008 | Zangirolami | |
| 10,882,598 | B2 * | 1/2021 | Chavez | B64C 1/143 |
| 10,900,289 | B2 | 1/2021 | Amri et al. | |
| 10,947,767 | B2 * | 3/2021 | Barbieri | B65H 75/486 |
| 11,548,655 | B2 * | 1/2023 | Smith | B64D 45/00 |
| 11,597,492 | B2 * | 3/2023 | Griffiths | E05D 15/0621 |
| 2003/0005635 | A1 | 1/2003 | Haag | E05F 15/646 |
| | | | | 49/141 |
| 2005/0044794 | A1 * | 3/2005 | Kriese | B60J 5/06 |
| | | | | 49/360 |
| 2006/0107598 | A1 * | 5/2006 | Imai | B60J 5/06 |
| | | | | 49/360 |
| 2006/0112643 | A1 * | 6/2006 | Yokomori | E05F 15/603 |
| | | | | 49/360 |
| 2006/0137136 | A1 * | 6/2006 | Imai | E05F 15/662 |
| | | | | 16/52 |
| 2010/0154313 | A1 * | 6/2010 | Elliott | E05F 15/646 |
| | | | | 49/360 |
| 2015/0033503 | A1 * | 2/2015 | Yamada | E05D 15/1047 |
| | | | | 16/91 |
| 2016/0060942 | A1 * | 3/2016 | Hansen | E05D 15/1042 |
| | | | | 49/352 |
| 2019/0119966 | A1 * | 4/2019 | Barbieri | E05F 1/16 |
| 2020/0216160 | A1 * | 7/2020 | Griffiths | E05D 15/1081 |
| 2021/0140215 | A1 * | 5/2021 | Choi | E05B 83/40 |

OTHER PUBLICATIONS

Gebuwin B.V., Gebuwin Quality Winches Catalog 2022, "Spur gear hand winch 1000-1500 kg" Wintersxijk, The Netherlands, 3 pages.

* cited by examiner

DOOR MANAGEMENT

TECHNICAL FIELD

This disclosure relates in general to the field of aircraft, and more particularly, but not by way of limitation, to managing, during flight, movement of a sliding door on an aircraft.

BACKGROUND

This section provides background information to facilitate a better understanding of the various aspects of the disclosure. It should be understood that the statements in this section of this document are to be read in this light, and not as admissions of prior art.

Traditional vertical flight aircraft such as helicopters commonly have side access openings that can be closed with a door. These doors are often hinged to swing between the open and closed position. If the door swings outward parallel to forward flight, forward flight will prevent opening the door. Some helicopters, such as the Bell UH-1 Huey have a sliding side door. Faster aircraft, such as airplanes, typically have doors at side access openings that do not move in the direction of flight, instead rotating vertically along the fuselage or swinging relative to the fuselage. Rotating the door in the vertical plane permits moving the door during forward flight. The introduction of tiltrotor aircraft such as Bell's V-22 Osprey introduce aircraft that transition between airplane flight mode and helicopter flight mode. Tiltrotor aircraft have a significantly greater maximum speed than traditional helicopters and endure greater acceleration and deceleration relative to other aircraft when converting between airplane flight and helicopter flight, for example when coming into or leaving a hot landing zone. The V-22 Osprey has a side opening with a door that swings or rotates relative to the vertical axis perpendicular to forward flight.

SUMMARY

An exemplary door management system on an aircraft includes a fuselage extending along a longitudinal axis in a fore-aft direction parallel to forward flight, an opening in a sidewall of the fuselage, a door mounted on the sidewall to slide in the fore-aft direction between a closed position covering the opening and an open position revealing the opening, a cable attached to the fuselage and the door and a speed governor operatively coupled to the cable to limit a velocity of the door as it moves between the open position and the closed position.

An exemplary tiltrotor aircraft having a vertical takeoff and landing (VTOL) flight mode and a forward flight mode includes a fuselage, a longitudinal X-axis, corresponding to a roll axis, extending through a center of the fuselage in a fore-aft direction parallel to forward flight, a transverse Y-axis, corresponding to a pitch axis, perpendicular to the longitudinal X-axis, and a vertical Z-axis, corresponding to a yaw axis, perpendicular to an X-Y plane, a wing extending laterally from the fuselage, first and second proprotors tiltable between the forward flight mode and the VTOL mode, an opening in a sidewall of the fuselage, a door mounted on the sidewall to slide in the fore-aft direction between a closed position covering the opening and an open position revealing the opening, a cable attached to the fuselage and the door and a speed governor operatively coupled to the cable to limit a velocity of the door as it moves between the open position and the closed position.

An exemplary method includes flying a tiltrotor aircraft comprising a fuselage extending along a longitudinal axis in a fore-aft direction parallel to a direction of forward flight, an opening in a sidewall of the fuselage, and a door mounted on the sidewall and slidable in the fore-aft direction between a closed position covering the opening and an open position revealing the opening, and utilizing a speed governor to limit a velocity of the door moving between the open position and the closed position.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
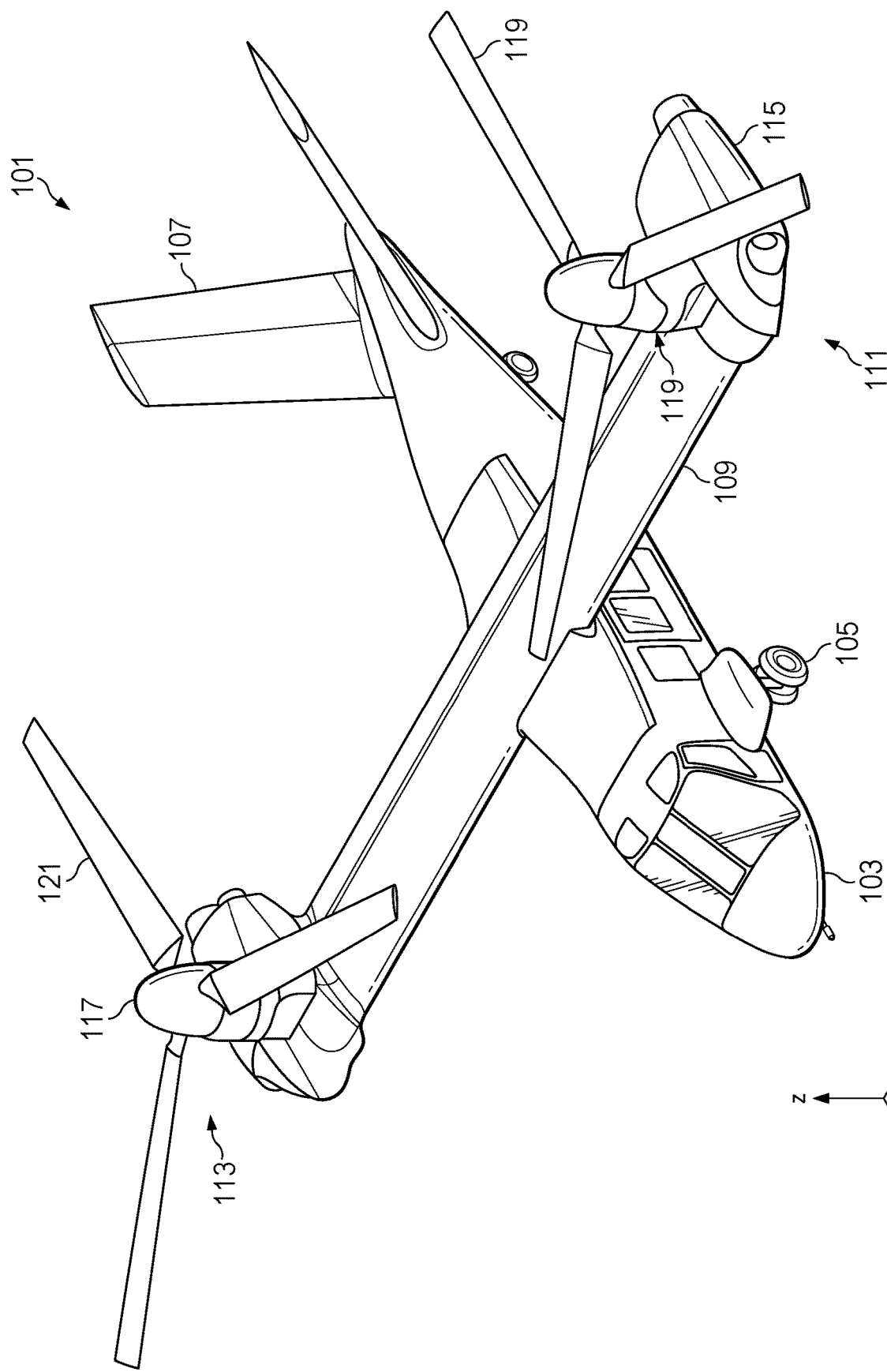
FIGS. 1 and 2 are schematic illustrations of an exemplary tiltrotor aircraft implementing a door management system in accordance with one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 2:
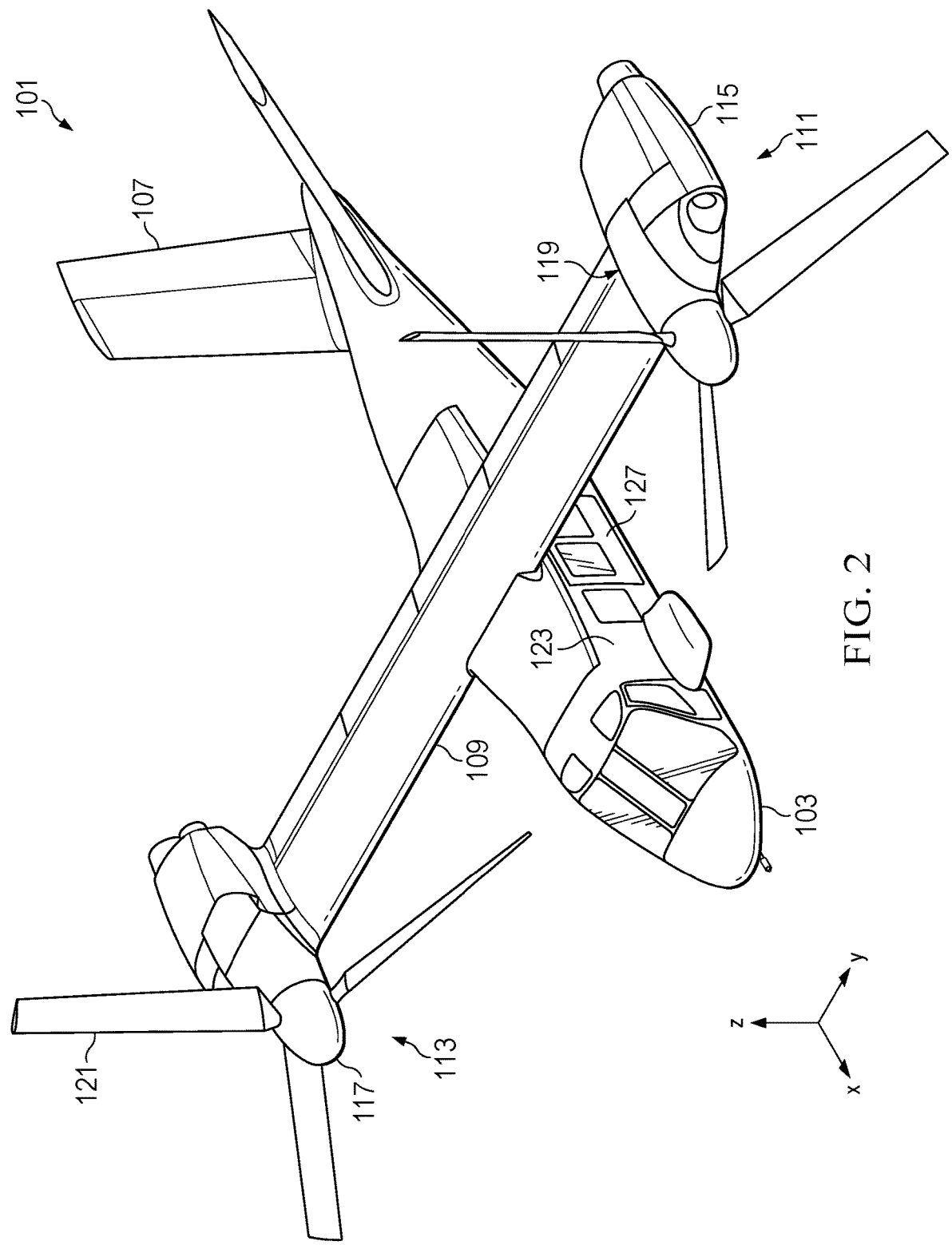

Referring to FIGS. 1 and 2, a tiltrotor aircraft is schematically illustrated and generally designated 101. Tiltrotor aircraft 101 includes a fuselage 103, landing gear 105, a tail member 107, a wing 109, a drive system 111, and a drive system 113. Each drive system 111, 113 includes a fixed engine 115 and a proprotor 117. Drive systems 111, 113 each includes a pylon 119 that is rotatable between a generally vertical orientation, as best seen in FIG. 1, and a generally horizontal position, as best seen in FIG. 2. Each proprotor 117 has a plurality of rotor blades 121. The position of proprotors 117, as well as the pitch of rotor blades 121, can be selectively controlled in order to selectively control direction, thrust, and lift of tiltrotor aircraft 101.

FIGS. 1 and 2 depict three mutually orthogonal directions X, Y, and Z forming a three-dimensional frame of reference XYZ. Longitudinal axis X corresponds to the roll axis that extends through the center of aircraft 101 in the fore-aft direction parallel to forward flight. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIG. 1 illustrates tiltrotor aircraft 101 in helicopter mode in which proprotors 117 are positioned substantially vertical, e.g., pylon angle at 90 degrees, to provide a lifting thrust. FIG. 2 illustrates tiltrotor aircraft 101 in an airplane mode in which proprotors 117 are positioned substantially horizontal, e.g., pylon angle at 0 degrees, to provide a forward thrust in which a lifting force is supplied by wing 109. It should be appreciated that tiltrotor aircraft 101 can be operated such that proprotors 117 are selectively positioned between airplane mode and helicopter mode, which can be referred to as a conversion mode. In conversion mode, the aircraft can rapidly accelerate and decelerate as the aircraft transitions between the airplane mode and helicopter mode.

It should be appreciated that tiltrotor aircraft 101 is merely illustrative of a variety of aircraft that can implement the embodiments disclosed herein. Indeed, door management may be utilized on any aircraft that uses a sliding door on a side of the fuselage. Other aircraft implementations can include hybrid aircraft, tiltwing aircraft, quad tiltrotor aircraft, unmanned aircraft, gyrocopters, airplanes, jets, helicopters, and the like. As such, those of ordinary skill in the art will recognize that the door management can be integrated into a variety of aircraft configurations. It should be appreciated that even though aircraft are particularly well-suited to implement the embodiments of the present disclosure, non-aircraft vehicles and devices can also implement the embodiments, including, but not limited to, automobiles or land-based vehicles.

Figure 3:
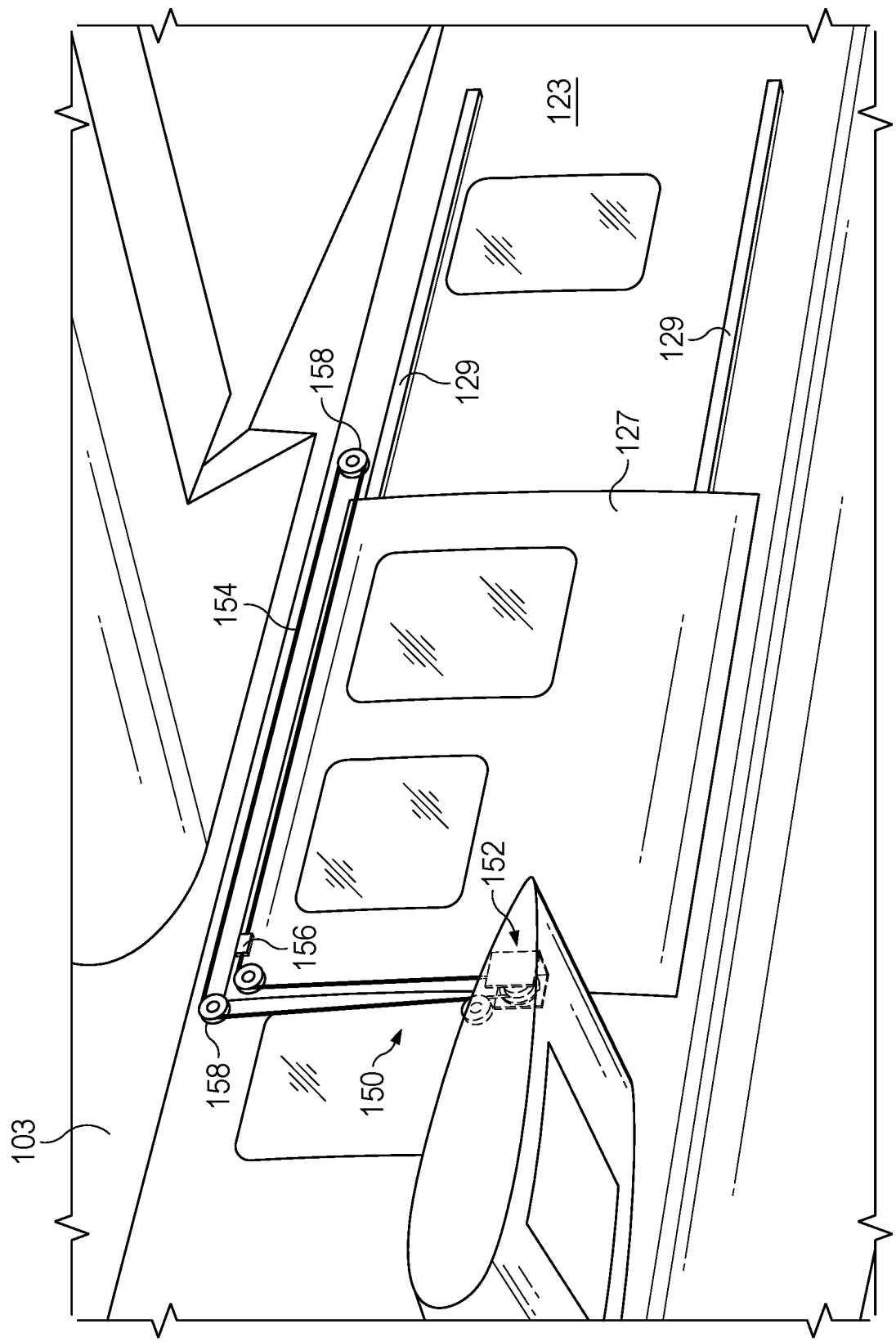
FIG. 3 illustrates an exemplary embodiment of a door management system implemented with a sliding sidewall door in an aircraft with the sliding door in a closed position.
Figure 4:
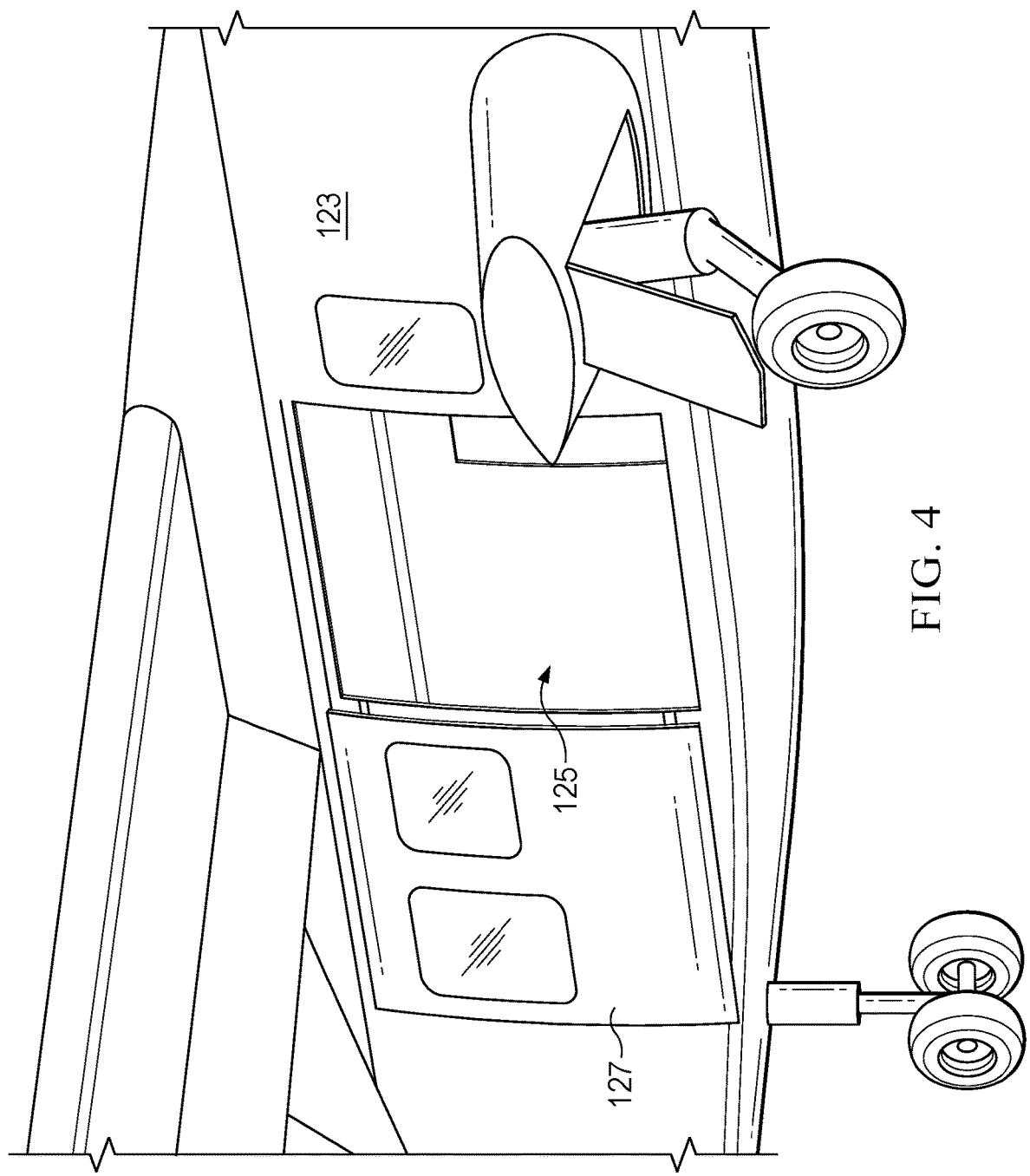
FIG. 4 illustrates an exemplary aircraft with a sliding sidewall door in a closed position.

With additional reference to FIGS. 3 and 4, fuselage 103 has a sidewall 123 extending in the vertical X-Z plane. An opening 125 (FIG. 4) is formed in sidewall 123. Opening 125 is sized to for loading and unloading personnel. A door 127 is slidably mounted on sidewall 123 and slidable in the direction between a closed position (FIGS. 2 and 3) covering opening 125 and an open position (FIG. 4) revealing opening 125 so that personnel can transit through opening 125. Door 127 is connected to tracks 129 located on sidewall 123 to slide between the open and closed positions.

A door management system 150 is connected to door 127 to slow a velocity of the door as it moves between the open position and the closed position. Use of large sliding doors in high-speed flight can be problematic. If a sliding door is opened at high speeds whether inadvertently, e.g., failure to secure closure, or intentionally, the force of the sliding door can damage the aircraft, injure passengers, and detach from the aircraft creating an airborne and ground hazard. Traditionally, sliding doors have not been used in high-speed aircraft such as tiltrotor aircraft and airplanes. Exemplary tiltrotor aircraft 101 may cruise for example at 280 knots. According to an exemplary standard, a maximum speed with a sliding door open is 120 knots equivalent speed (KEAS) and a maximum speed for opening a sliding door is 80 KEAS. If the door is opened at high speeds, for example and without limitation, over about 120 KEAS the door management system prevents the door from developing enough energy to damage the aircraft. The door management can slow the velocity of the moving door to a magnitude, based on mass and area of the door, so that the load of the door does not surpass capability the door retention mechanism to maintain the door on the aircraft. Additionally, limiting the load produced by the opening door facilitates the use of lighter door tracks thereby decreasing the total weight of the aircraft.

Unique cases related to operation of a tiltrotor aircraft include high speed ingress to and egress from a landing zone. If the door is opened too early in a high-speed ingress into a landing zone, the speed of the aircraft and or the acceleration on the door as the aircraft converts from airplane mode to hover mode can injure passengers, damage the door, and damage the aircraft. As an aircraft leaves a contested landing zone, passengers may be returning fire and by the time the threat is out of range the aircraft may be moving too fast to safely close the door. In some embodiments, the door management can provide a mechanical advantage to remotely close the door.

Door management system 150 includes a speed governor 152 coupled to door 127. An exemplary speed governor 152 is a viscous speed governor. Another example of a speed governor 152 is a centrifugal brake. Other devices may be utilized as a speed governor, including without limitation an electric or hydraulic motor.

An exemplary door management system 150 illustrated in FIG. 3 includes a cable 154 connected to fuselage 103 and door 127. Cable 154 is fixedly attached to door 127 via a connector 156, e.g., trolley fitting and connected to fuselage 103 via pulleys 158. Cable 154 extends the fore-aft direction (X-axis) the distance of travel of door 127 between the open and closed positions. Speed governor 152 is connected to the door via cable 154 and to limit the velocity of the door traveling to the open position or to the closed position. The velocity limit may be calculated based on various characteristics and concerns to mitigate the risk of damage to personnel, the aircraft, and the door, if the door is released during high-speed or acceleration operation. Exemplary characteristics include the door load produced by the door traveling at velocity.

Figure 5:
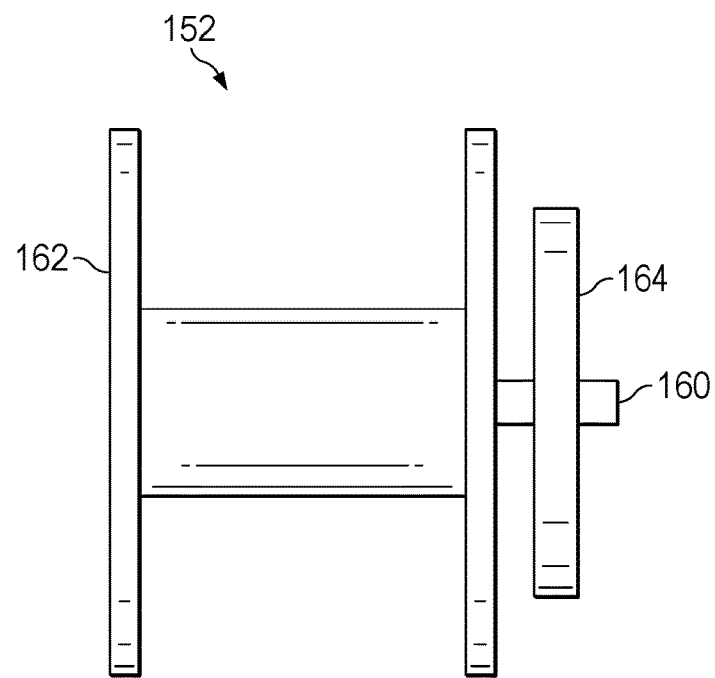
FIG. 5 schematically illustrates an exemplary speed governor.

FIG. 5 illustrates an exemplary speed governor 152. Speed governor 152 comprises a shaft 160 that attaches to the cable, e.g., via spool 162, and rotates in response to movement the door. Speed governor 152 includes a brake 164 that applies a dampening torque to shaft 160 to limit the maximum velocity of the moving door attached to the cable. Exemplary brakes speed governors include viscous limiters and centrifugal brakes. A viscous speed governor may increasingly apply a damping torque with an increasing speed of the shaft and thus the door. A centrifugal brake provides a generally constant braking force once it is actuated.

Figure 6:
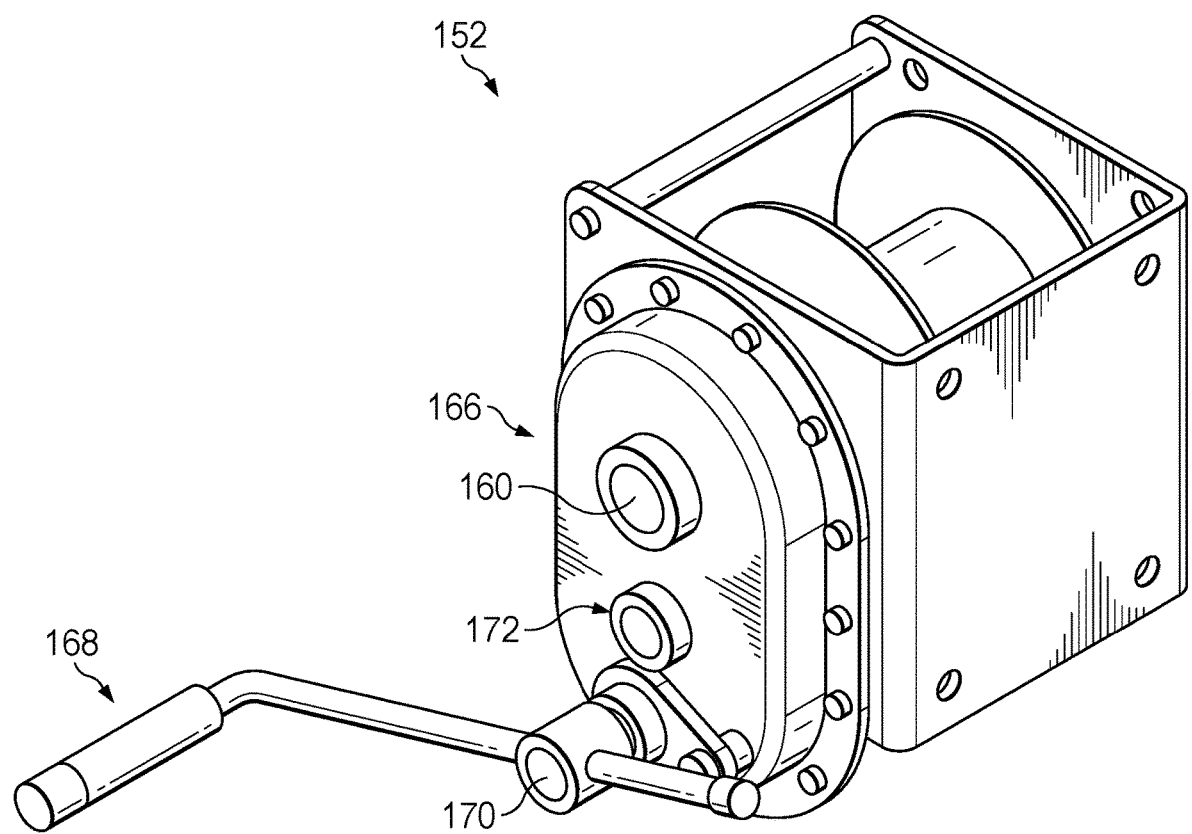
FIG. 6 schematically illustrates an exemplary speed governor implemented with a winch.

FIG. 6 illustrates an exemplary speed governor 152 implemented with a winch 166. Winch 166 includes an actuator 168 coupled to an input shaft 170 to apply torque to output shaft 160 to move the cable and thus the door. Input shaft 170 may be coupled to output shaft 160 via gearing 172. Actuator 168 is illustrated as a handle in FIG. 6 through which personnel manually applies torque. In some embodiments, actuator 168 is a motor, electric or hydraulic. The motor may be connected to shaft 160 without gearing. The motor can serve as the brake, replacing brake 164 in FIG. 5. An actuator 168 may be implemented in particular to provide the motive force necessary to overcome the aerodynamic forces to close the door.

An exemplary method is now described with reference to FIGS. 1-6. During flight of an aircraft, such as tiltrotor aircraft 101, a sliding door 127 on a sidewall of the fuselage is released, intentionally or inadvertently, and is free to move between the open and closed positions. A speed governor is used to limit the velocity of the door to prevent it from developing enough energy to injure passengers, damage the aircraft, or damage the door.

Although relative terms such as "outer," "inner," "upper," "lower," and similar terms have been used herein to describe a spatial relationship of one element to another, it is understood that these terms are intended to encompass different orientations of the various elements and components in addition to the orientation depicted in the figures. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. The terms "substantially," "approximately," "generally," and "about" are defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A door management system on an aircraft comprising:
    a fuselage extending along a longitudinal axis in a fore-aft direction parallel to forward flight;
    an opening in a sidewall of the fuselage;
    a door mounted on the sidewall to slide in the fore-aft direction between a closed position covering the opening and an open position revealing the opening;
    a cable attached to the fuselage via a plurality of pulleys and the door via a connector; and
    a speed governor attached to the door, wherein the speed governor is operatively coupled to the cable to limit a velocity of the door as it moves between the open position and the closed position.

2. The door management system of claim 1, wherein the speed governor is a viscous speed limiter.

3. The door management system of claim 1, wherein the speed governor is a centrifugal brake.

4. The door management system of claim 1, wherein the speed governor is a motor.

5. The door management system of claim 4, wherein the motor is an electric motor.

6. The door management system of claim 1, wherein the speed governor comprises a shaft coupled to the cable to rotate with the cable and movement of the door; and
    a brake coupled to the shaft to limit the velocity.

7. The door management system of claim 6, wherein the brake is a viscous speed limiter configured to increasingly apply a dampening load with an increasing velocity of the door.

8. The door management system of claim 6, wherein the brake is a motor.

9. A tiltrotor aircraft having a vertical takeoff and landing (VTOL) flight mode and a forward flight mode, the tiltrotor aircraft comprising:
    a fuselage;
    a longitudinal X-axis, corresponding to a roll axis, extending through a center of the fuselage in a fore-aft direction parallel to forward flight, a transverse Y-axis, corresponding to a pitch axis, perpendicular to the longitudinal X-axis, and a vertical Z-axis, corresponding to a yaw axis, perpendicular to an X-Y plane;
    a wing extending laterally from the fuselage;
    first and second proprotors tiltable between the forward flight mode and the VTOL mode;
    an opening in a sidewall of the fuselage;
    a door mounted on the sidewall to slide in the fore-aft direction between a closed position covering the opening and an open position revealing the opening;
    a cable attached to the fuselage via a plurality of pulleys and the door via a connector; and
    a speed governor attached to the door, wherein the speed governor is operatively coupled to the cable to limit a velocity of the door as it moves between the open position and the closed position.

10. The tiltrotor aircraft of claim 9, wherein the speed governor is a viscous speed limiter.

11. The tiltrotor aircraft of claim 9, wherein the speed governor is a centrifugal brake.

12. The tiltrotor aircraft of claim 9, wherein the speed governor is a motor.

13. The tiltrotor aircraft of claim 12, wherein the motor is an electric motor.

14. The tiltrotor aircraft of claim 9, wherein the speed governor comprises a shaft coupled to the cable to rotate with the cable and movement of the door; and
    a brake coupled to the shaft to limit the velocity.

15. The tiltrotor aircraft of claim 14, wherein the brake is a viscous speed limiter configured to increasingly apply a dampening load with an increasing velocity of the door.

16. The tiltrotor aircraft of claim 14, wherein the brake is a motor.

17. A method, comprising:
    flying a tiltrotor aircraft comprising a fuselage extending along a longitudinal axis in a fore-aft direction parallel to a direction of forward flight, an opening in a sidewall of the fuselage, a door mounted on the sidewall and slidable in the fore-aft direction between a closed position covering the opening and an open position revealing the opening, and a cable connected to the fuselage via a plurality of pulleys and the door via a connector; and utilizing a speed governor that is attached to the door to limit a velocity of the door moving between the open position and the closed position.

18. The method of claim 17, wherein the speed governor is connected to the cable.

19. The method of claim 18, wherein the speed governor increases a damping load on the cable with an increasing velocity of the cable and the door.

20. The method of claim 18, further comprising a winch connected to the cable.

* * * * *